United States Patent
Yang et al.

(10) Patent No.: US 11,795,063 B2
(45) Date of Patent: Oct. 24, 2023

(54) TITANIA-CARBON NANOTUBE-SULFUR ($TIO_{2-x}$-CNT-S) COMPOSITE AND PREPARING METHOD THEREFOR

(71) Applicants: LG CHEM, LTD., Seoul (KR); SOGANG UNIVERSITY RESEARCH FOUNDATION, Seoul (KR)

(72) Inventors: Seungbo Yang, Daejeon (KR); Eunkyung Cho, Daejeon (KR); Jun Hyuk Moon, Seoul (KR); Kwonnam Sohn, Daejeon (KR); Doo Kyung Yang, Daejeon (KR); Jaehyun Lee, Daejeon (KR); Donghee Gueon, Seoul (KR)

(73) Assignees: LG ENERGY SOLUTION, LTD., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 264 days.

(21) Appl. No.: 16/651,706

(22) PCT Filed: Sep. 19, 2018

(86) PCT No.: PCT/KR2018/011054
§ 371 (c)(1),
(2) Date: Mar. 27, 2020

(87) PCT Pub. No.: WO2019/066366
PCT Pub. Date: Apr. 4, 2019

(65) Prior Publication Data
US 2020/0255298 A1    Aug. 13, 2020

(30) Foreign Application Priority Data
Sep. 28, 2017    (KR) .................. 10-2017-0126100

(51) Int. Cl.
*C01G 23/047*    (2006.01)
*C01B 32/158*    (2017.01)
(Continued)

(52) U.S. Cl.
CPC ............ *C01G 23/047* (2013.01); *C01B 17/00* (2013.01); *C01B 32/158* (2017.08);
(Continued)

(58) Field of Classification Search
None
See application file for complete search history.

(56) References Cited

U.S. PATENT DOCUMENTS

2007/0074601 A1    4/2007  Hong et al.
2009/0304570 A1    12/2009 Kim et al.
(Continued)

FOREIGN PATENT DOCUMENTS

CN    101541674 A    9/2009
CN    102971891 A    3/2013
(Continued)

OTHER PUBLICATIONS

Zhang et al., "Sulfur Encapsulated in a Ti02-Anchored Hollow Carbon Nanofiber Hybrid Nanostructure for Lithium-Sulfur Batteries," Chemistry A European Journal, vol. 21, 2015, pp. 1343-1349. (Year: 2015).*

(Continued)

*Primary Examiner* — Daniel S Gatewood
(74) *Attorney, Agent, or Firm* — Birch, Stewart, Kolasch & Birch, LLP

(57) ABSTRACT

A titania-carbon-sulfur composite including a titania-carbon composite prepared by mixing cylindrical carbon materials and titania ($TiO_{2-x}$), in which some oxygen is reduced (i.e., x is less than 2), to have a structure in which cylindrical carbon materials are entangled and interconnected in three (Continued)

dimensions; and sulfur introduced into at least a part of the external surface and inside of the titania-carbon ($TiO_2$—C) composite, and a method for preparing the same.

19 Claims, 9 Drawing Sheets

(51) Int. Cl.
*C01B 17/00* (2006.01)
*H01M 4/04* (2006.01)
*H01M 10/0525* (2010.01)
*H01M 4/02* (2006.01)

(52) U.S. Cl.
CPC ....... *H01M 4/0471* (2013.01); *C01P 2004/12* (2013.01); *C01P 2004/61* (2013.01); *C01P 2006/12* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2013/0037758 A1 | 2/2013 | Kim et al. |
| 2017/0110719 A1 | 4/2017 | Wang et al. |
| 2017/0346090 A1 | 11/2017 | Hanawa et al. |

FOREIGN PATENT DOCUMENTS

| | | | | |
|---|---|---|---|---|
| CN | 104201392 A | | 12/2014 | |
| CN | 104795553 A | | 7/2015 | |
| CN | 105304932 A | | 2/2016 | |
| CN | 106711456 A | | 5/2017 | |
| CN | 106784819 A | * | 5/2017 | .............. H01M 4/38 |
| CN | 107004519 A | | 8/2017 | |
| JP | 2001-207077 A | | 7/2001 | |
| JP | 2012-30989 A | | 2/2012 | |
| JP | 2017-517467 A | | 6/2017 | |
| KR | 10-2005-0012556 A | | 2/2005 | |
| KR | 10-0840742 B1 | | 6/2008 | |
| WO | WO 2017/152171 A1 | | 9/2017 | |

OTHER PUBLICATIONS

He et al., Microstructure and mechanical properties of a novel plasma-spray TiO2 coatting reinforced by CNTs, Ceramics International, vol. 42, 2016, pp. 13319-13325 (Year: 2016).*
Liang et al., Sulfur Cathodes with Hydrogen Reduced Titanium Dioxide Inverse Opal Structure, 2014, ACS Nano, 8, 5249-5256 (Year: 2014).*
International Search Report (PCT/ISA/210) issued in PCT/KR2018/011054, dated Jan. 8, 2019.
Li et al. "Mesoporous TiO2 Nanocrystals/Graphene as an Efficient Sulfur Host Material for High-Performance Lithium-Sulfur Batteries," ACS Applied Materials & Interfaces, vol. 8, No. 36, 2016, pp. 23784-23792.
Liang et al., "Sulfur Cathodes with Hydrogen Reduced Titanium Dioxide Inverse Opal Structure," ACS Nano, vol. 8, No. 5, 2014, pp. 5249-5256.
Yang et al., "Hierarchical TiO2 spheres as highly efficient polysulfide host for lithium-sulfur batteries," Scientific Reports, vol. 6, No. 22990, 2016, pp. 1-8.
Yu et al., "Atomic layer deposited Ti02 on a nitrogen-doped graphene/sulfur electrode for high performance lithium-sulfur batteries," Energy & Environmental Science, vol. 9, 2016, pp. 1495-1503.
Zhang et al., "Sulfur Encapsulated in a Ti02-Anchored Hollow Carbon Nanofiber Hybrid Nanostructure for Lithium-Sulfur Batteries," Chemistry A European Journal, vol. 21, 2015, pp. 1343-1349.
He et al., "Microstructure and mechanical properties of a novel plasma-spray TiO2 coatting reinforced by CNTs," Ceramics International, vol. 42, No. 11, May 12, 2016, pp. 13319-13325 (7 pages total).

* cited by examiner

【Figure 1】
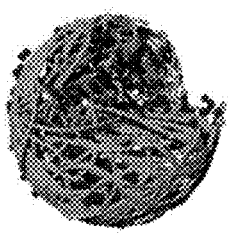
【Figure 2】
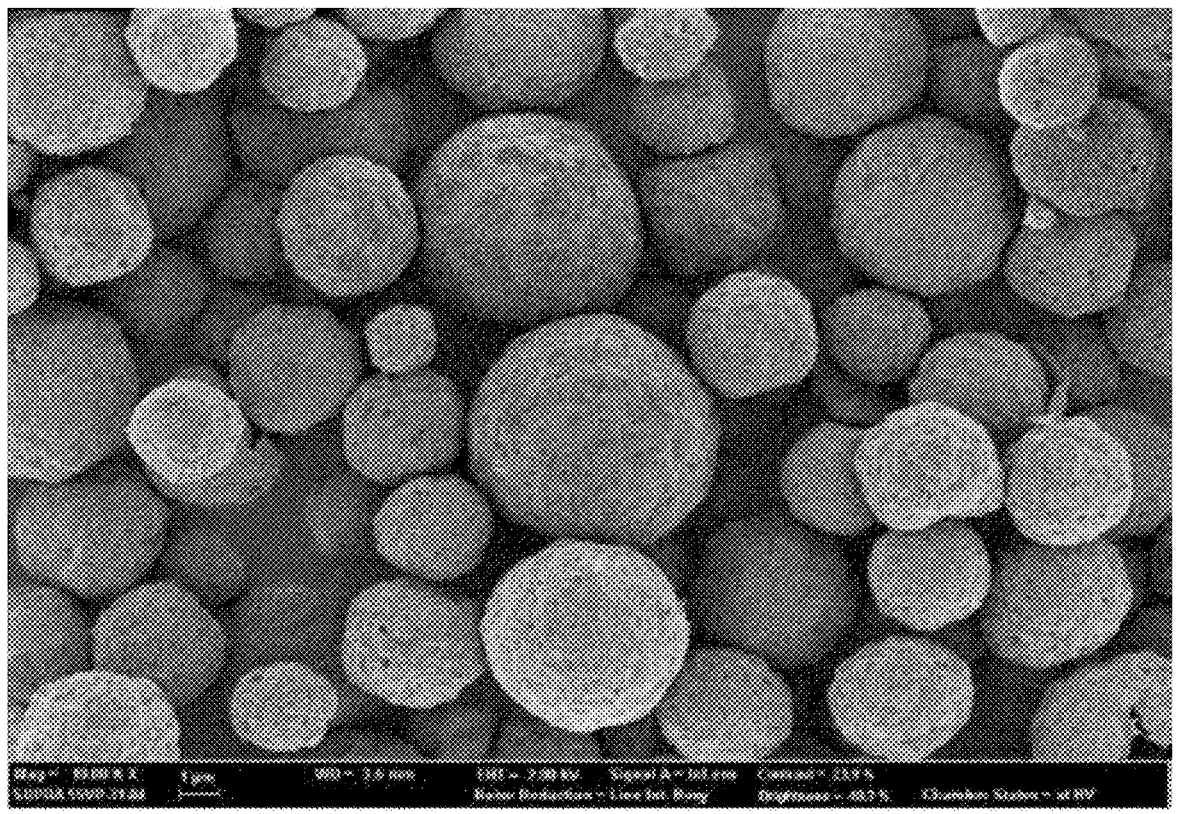

[Figure 3]
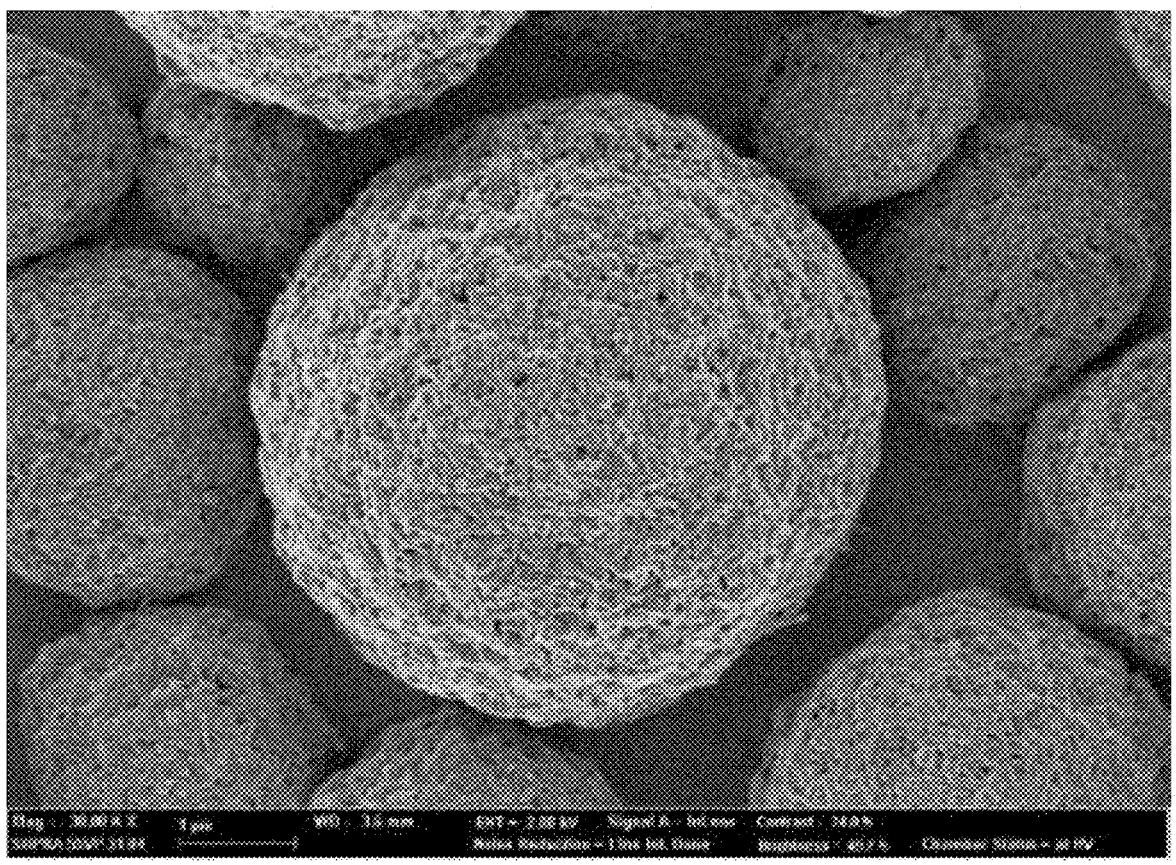

[Figure 4]
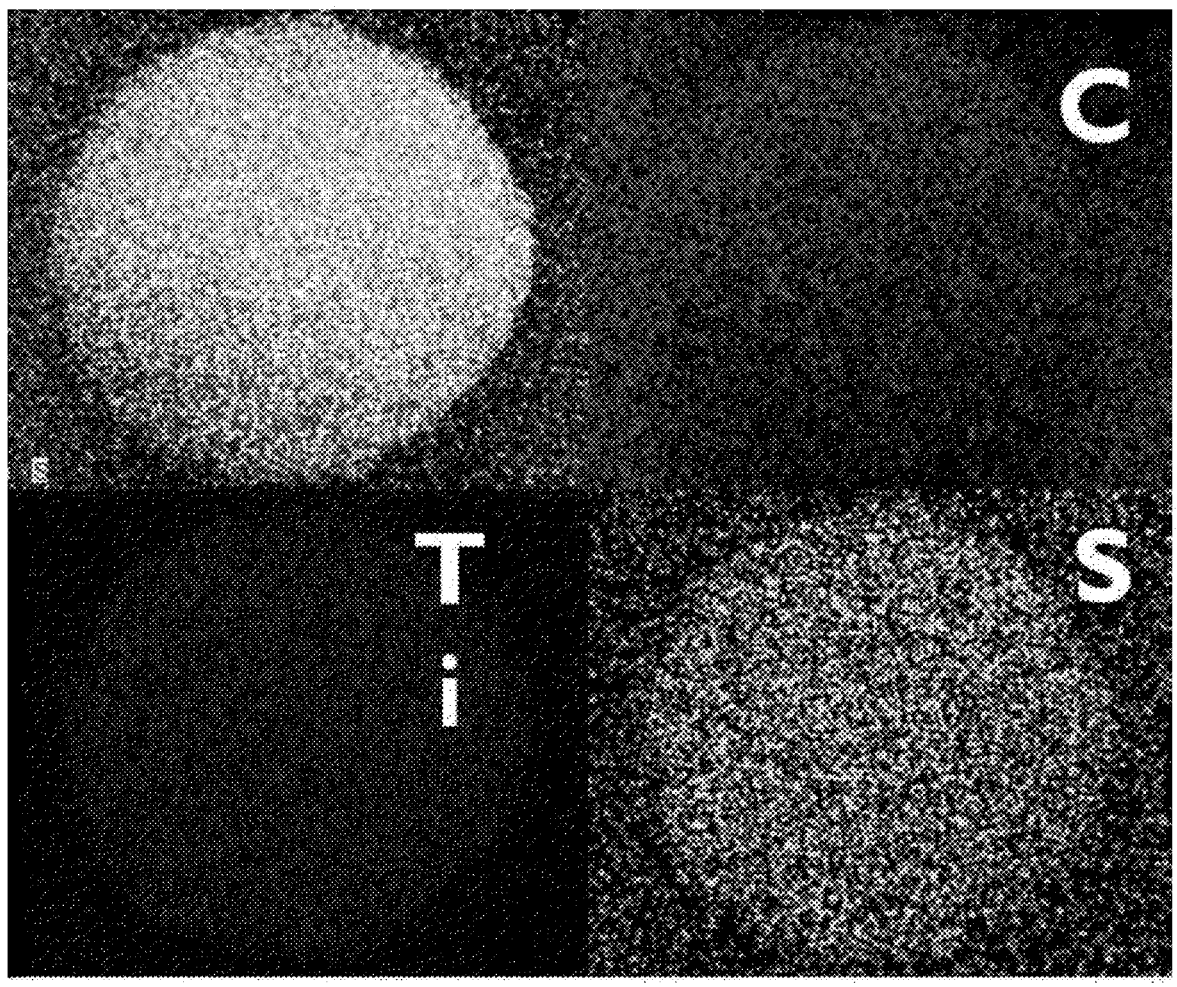

[Figure 5]
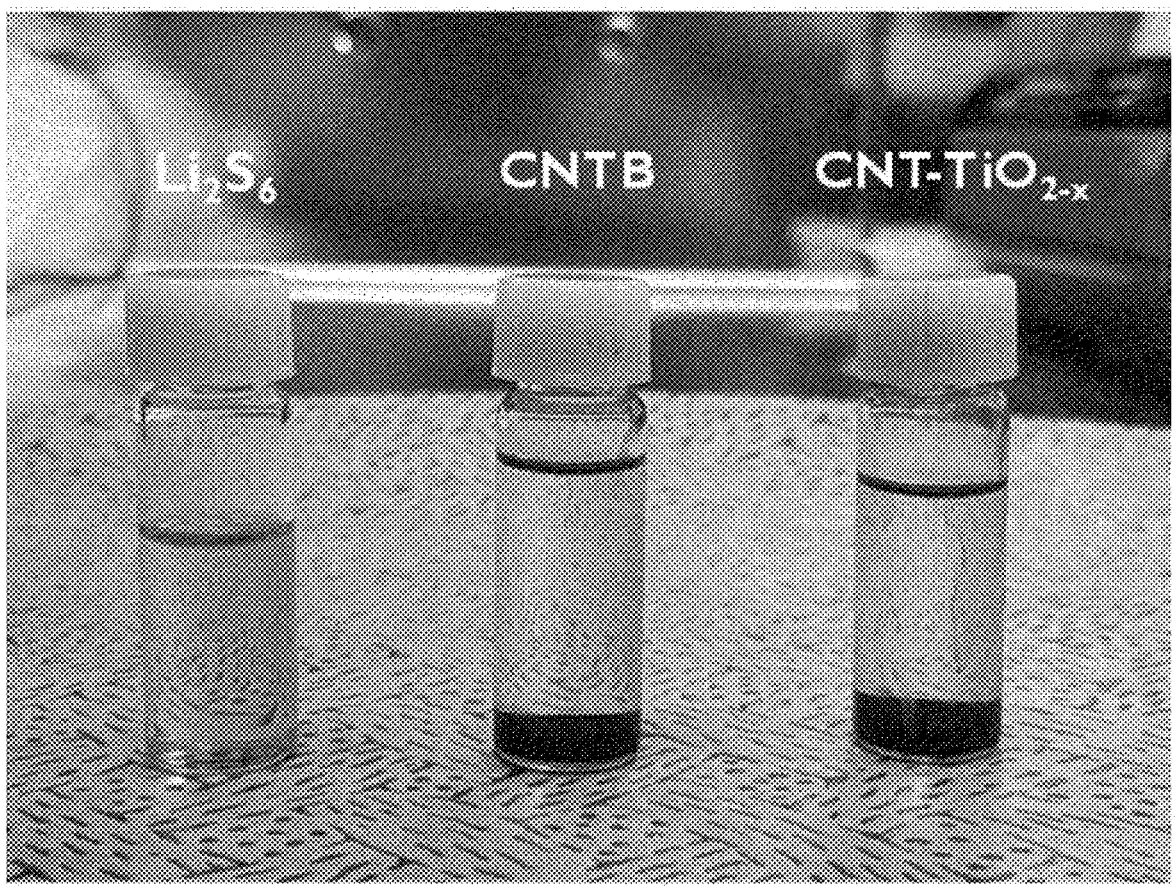

[Figure 6]
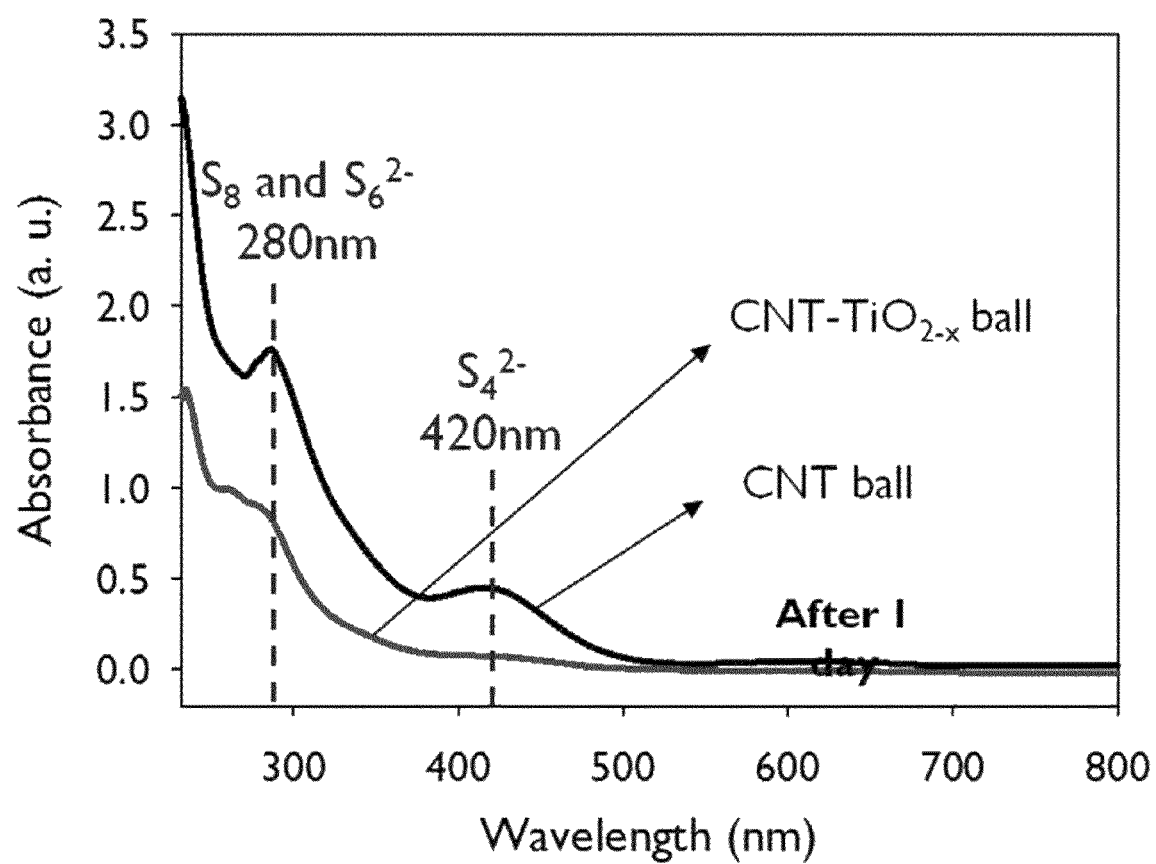

[Figure 7]
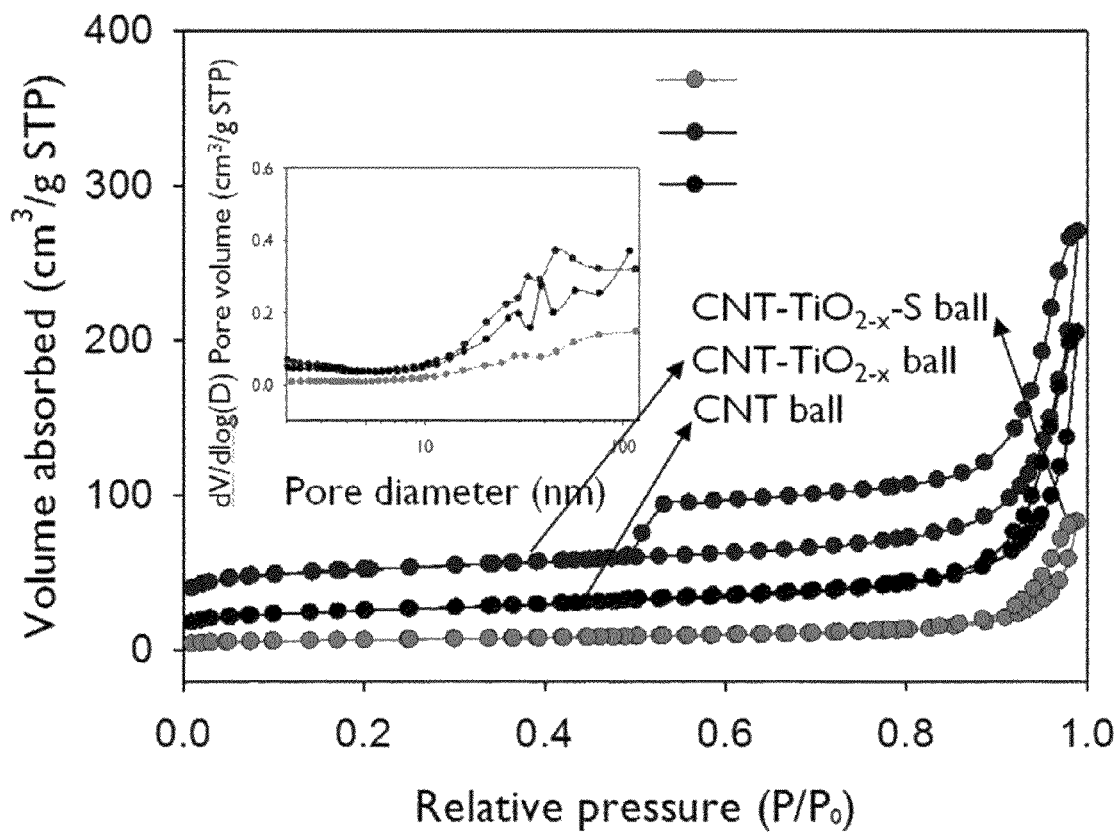

[Figure 8]
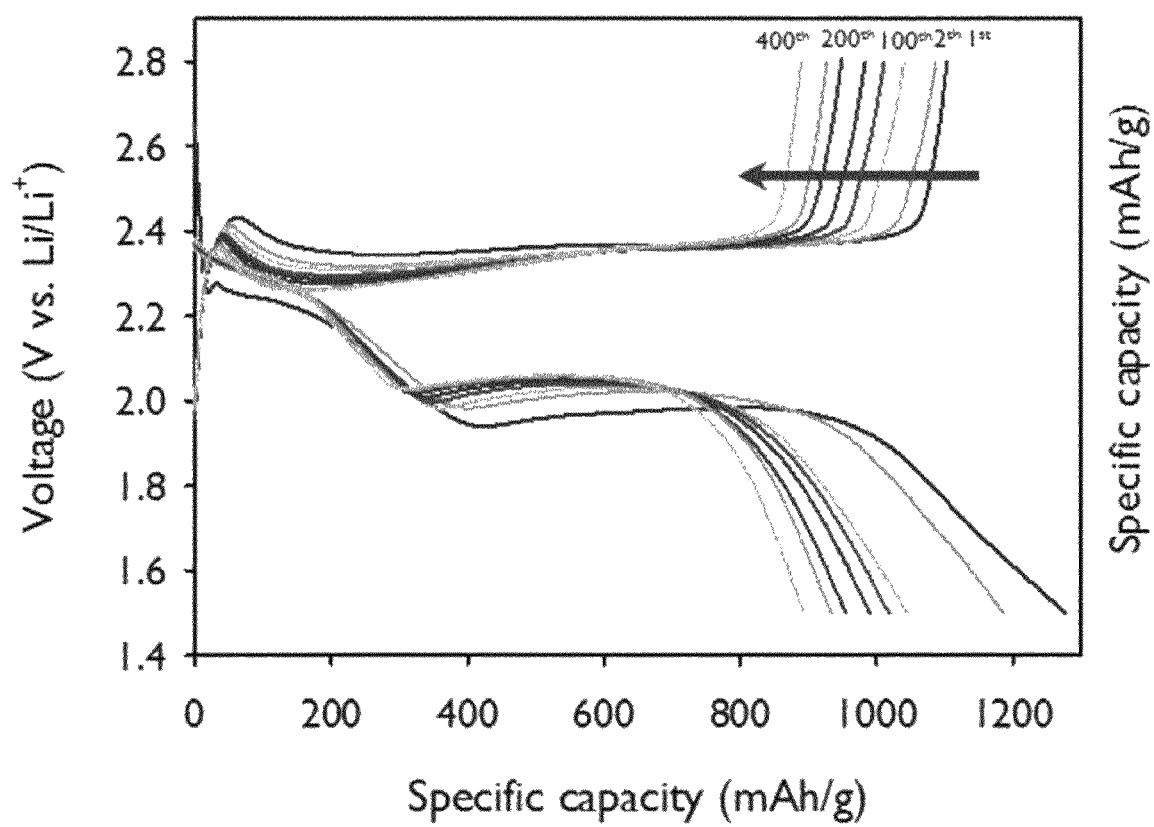

[Figure 9]
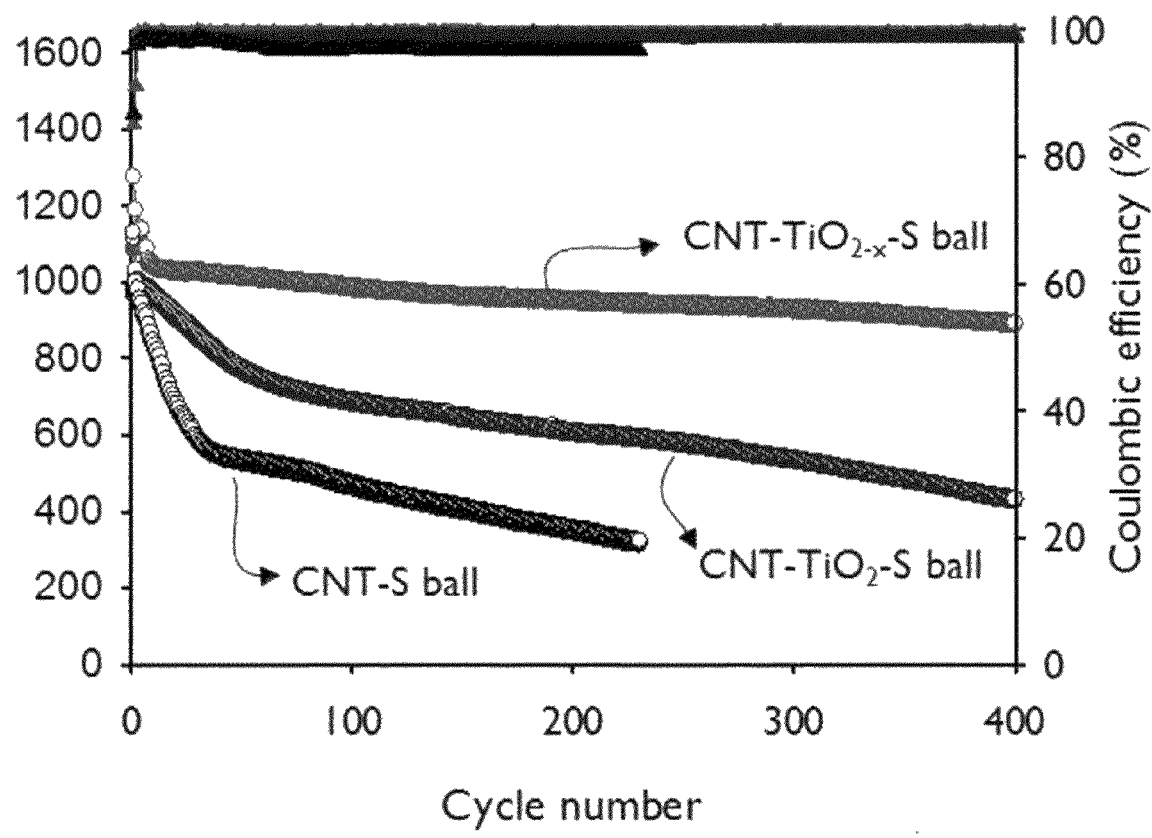

[Figure 10]
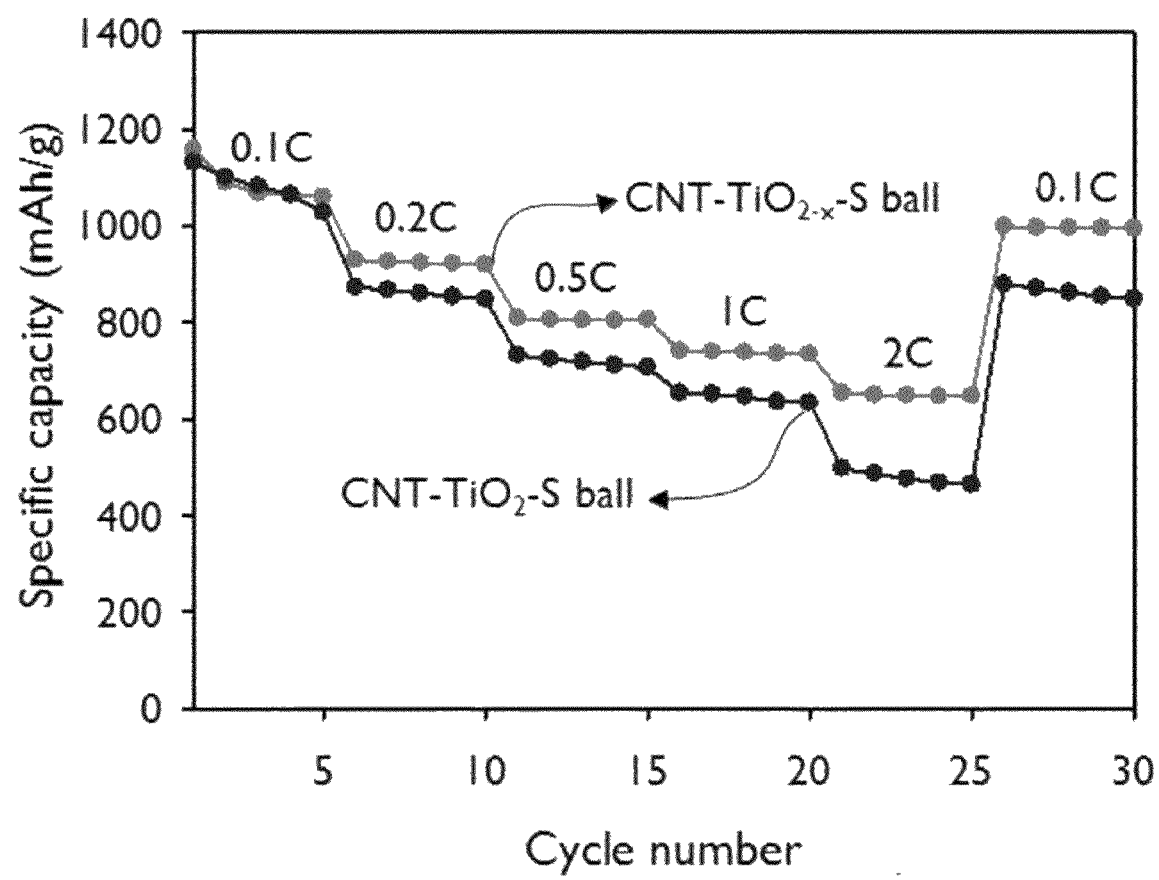

ately, as the miniaturization and weight reduction of electronic products, electronic devices, communication devices, and the like are rapidly progressing and the need for

TITANIA-CARBON NANOTUBE-SULFUR ($TIO_{2-x}$-CNT-S) COMPOSITE AND PREPARING METHOD THEREFOR

TECHNICAL FIELD

The present application claims the benefit of Korean Patent Application No. 10-2017-0126100 filed on Sep. 28, 2017, all the contents of which are incorporated herein by reference.

The present invention relates to a titania-carbon nanotube-sulfur ($TiO_{2-x}$-CNT-S) composite and a method of preparing the same.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements in secondary batteries used as power sources for these products. Among them, the lithium secondary battery has been attracting considerable attention as a high-performance battery due to its high energy density and high standard electrode potential.

In particular, the lithium-sulfur (Li—S) battery is a secondary battery using a sulfur-based material having an S—S bond (sulfur-sulfur bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). Sulfur before discharging has an annular $S_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic $S_8$ structure to the lithium polysulfide ($Li_2S_x$, x=8, 6, 4, 2) by the reduction reaction and eventually, when the lithium polysulfide is completely reduced, lithium sulfide ($Li_2S$) is finally produced. By the process of reducing to each lithium polysulfide, the discharging behavior of the lithium-sulfur battery is characterized by a step-wise discharge voltage unlike lithium ion battery.

However, in the case of lithium-sulfur battery, the problem of rapid capacity reduction according to low coulomb efficiency and charging/discharging due to the problems of the low electrical conductivity, the leaching of lithium polysulfide during charging and discharging, and volume expansion of sulfur should be addressed.

In the prior art, in order to improve the lifetime characteristics of lithium sulfur battery, studies have been conducted to prevent the leaching of LiPSs produced during charging and discharging, and typically, studies on the physical adsorption through the design of various pores and the chemical adsorption by the introduction of various oxides have been carried out. However, in order to introduce various oxides, there is a limitation in that electrode materials can be prepared only through a complex process such as ALD and Hydrothermal Also, in the prior art, since the production of carbon materials for lithium-sulfur batteries through mass production and simple processes from the standpoint of commercialization is still under development, development of a low-cost process is required.

(Patent Literature 1) Chinese Patent Laid-open Publication No. 106784819, "A kind of lithium sulfur battery positive electrode material and its manufacturing method"

DISCLOSURE

Technical Problem

In order to solve the above problems, the inventors of the present invention have studied whether the spherical CNT-$TiO_{2-x}$ particles can be applied as an electrode of a lithium-sulfur battery, wherein the spherical CNT-$TiO_{2-x}$ particles is obtained by mixing a $TiO_2$ dispersion with a cylindrical carbon material dispersion to prepare a dispersion and then subjecting the dispersion to a spray-drying and a thermal reduction which are simple processes while enabling the mass production, and have consequently completed the present invention.

Therefore, it is an object of the present invention to provide a titania-carbon-sulfur ($TiO_{2-x}$—C—S) composite which can be mass produced through simple processes such as spray-drying, can exhibit high lifetime characteristics through the high chemical adsorption force of $TiO_{2-x}$ with LiPSs in electrochemical evaluation, can maintain electrode stability even at high electrode loading per unit area, and also can retain the existing ion and charge transfer properties, thereby maintaining high electrochemical properties.

Technical Solution

In order to achieve the above object, the present invention provides a titania-carbon-sulfur ($TiO_{2-x}$—C—S) composite, comprising a titania-carbon ($TiO_{2-x}$—C) composite prepared by mixing cylindrical carbon materials and titania ($TiO_{2-x}$), in which some oxygen is reduced, to obtain a structure in which cylindrical carbon materials are entangled and interconnected in three dimensions; and sulfur introduced into at least a part of the external surface and inside of the titania-carbon ($TiO_2$—C) composite.

In addition, the present invention provides a method for preparing a titania-carbon-sulfur ($TiO_{2-x}$—C—S) composite comprising the steps of a) preparing a dispersion of a mixture of a cylindrical carbon material and $TiO_2$; b) spray-drying the dispersion to prepare a titania-carbon ($TiO_2$—C) composite; c) subjecting the titania-carbon ($TiO_2$—C) composite to a thermal reduction treatment to prepare a titania-carbon ($TiO_{2-x}$—C) composite; and d) impregnating the titania-carbon ($TiO_{2-x}$—C) composite with sulfur to prepare the titania-carbon-sulfur ($TiO_{2-x}$—C—S) composite.

In addition, the present invention provides a positive electrode comprising the titania-carbon-sulfur ($TiO_{2-x}$-CNT-S) composite.

In addition, the present invention provides a lithium-sulfur battery including the positive electrode; a negative electrode; and an electrolyte.

Advantageous Effects

The titania-carbon-sulfur ($TiO_{2-x}$—C—S) composite of the present invention can be mass-produced through the simple process such as spray-drying. In addition, the titania-carbon-sulfur ($TiO_{2-x}$—C—S) composite of the present invention has the effects capable of having high lifetime characteristics through the high chemical adsorption force of $TiO_{2-x}$ with LiPSs in the electrochemical evaluation, maintaining electrode stability even at high electrode loading per unit area, and also retaining the existing ion and charge transfer properties, thereby maintaining high electrochemical properties.

DESCRIPTION OF DRAWINGS

FIG. 1 is a schematic view showing the structure of the titania-carbon ($TiO_{2-x}$—C) composite of the present invention.

FIG. 2 is a SEM photograph of a titania-carbon ($TiO_{2-x}$—C) composite taken during the preparing process of Example 1 of the present invention.

FIG. 3 is a SEM photograph of a titania-carbon-sulfur ($TiO_{2-x}$—C—S) composite taken during the preparing process of Example 1 of the present invention.

FIG. 4 is an EDX photograph of a titania-carbon-sulfur ($TiO_{2-x}$—C—S) composite taken during the preparing process of Example 1 of the present invention.

FIG. 5 is a photograph for comparing the polysulfide adsorption ability of the composites of Example 1 of the present invention and Comparative Example 1.

FIG. 6 is a graph showing the results of an UV-vis spectroscopy analysis for the composites of Example 1 of the present invention and Comparative Example 1.

FIG. 7 is a graph showing the results of a BET analysis for the composites of Example 1 of the present invention, Comparative Example 1 and Comparative Example 3.

FIG. 8 is a graph showing the results of a charging-discharging analysis for a battery using the composite of Example 2 of the present invention.

FIG. 9 is a graph showing the results of a cycle performance analysis for batteries using the composites of Example 2 of the present invention, Comparative Example 2 and Comparative Example 4.

FIG. 10 is a graph showing the result of a rate capability analysis of a battery using composites of Example 2 of the present invention and Comparative Example 4.

BEST MODE

Hereinafter, the present invention will be described in detail in order that a person skilled in the art to which the present invention pertains can easily carry out the present invention. However, the present invention may be embodied in many different forms and is not limited to the example described herein.

Titania-Carbon-Sulfur ($TiO_{2-x}$—C—S) Composite

The present invention provides a titania-carbon-sulfur ($TiO_{2-x}$—C—S) composite containing sulfur introduced into at least a part of the external surface and inside of the titania-carbon ($TiO_{2-x}$—C) composite.

The titania-carbon ($TiO_{2-x}$—C) composite used herein means a composite having a structure in which cylindrical carbon materials are entangled and interconnected to each other in three dimensions wherein the structure is formed by mixing cylindrical carbon materials and titania ($TiO_{2-x}$), in which some oxygen is reduced, as shown in FIG. 1. In some oxygen-reduced titania ($TiO_{2-x}$) of the present invention, x represents the degree of reduction of oxygen, x may have the value of less than 2, and preferably 0<x<2.

In this case, the three-dimensional structure can mean that the intersections where two or more strands intersect are distributed in three dimensions Also, the three-dimensional structure can mean that each basic unit entangled in two dimensions is entangled in three dimensions and thus finally has a three-dimensional structure. The "entangled" may mean that two or more strands are crossed with each other through physical contact.

In the present invention, the structure is a structure in which cylindrical carbon materials are aggregated and interconnected.

The cylindrical carbon material may be at least one selected from the group consisting of carbon nanotube (CNT), graphite nanofiber (GNF), carbon nanofiber (CNF), and activated carbon fiber (ACF).

The cylindrical carbon material refers to a carbon material having a rod type grown in one direction or a cylindrical structure having an empty interior, which are not spherical particles or flakes. This cylindrical structure, rather than spherical particles, can easily form macro-pores aligned in one direction. In other words, the spherical carbon materials (e.g., carbon black, etc.) rather than the cylindrical carbon materials may be considered as a raw material for the production of titania-carbon ($TiO_{2-x}$—C) composite. However, the use of the spherical carbon materials is not easy to form macro-pores that are three dimensionally interconnected and well aligned. The cylindrical carbon material is preferably a carbon material having nano structure, and specifically may be carbon nanotube (CNT), graphite nanofiber (GNF), carbon nanofiber (CNF) or activated carbon fiber (ACF), and more preferably may be a carbon nanotube. In addition, both single-wall carbon nanotubes (SWCNT) and multi-wall carbon nanotubes (MWCNT) can be used as the carbon nanotube, and also the carbon nanotube has one or more shapes selected from the group consisting of a spherical type, an entangled type, and a bundle type depending on the preparing method.

The titania-carbon ($TiO_{2-x}$—C) composite is spherical or ellipsoidal particles which has a net structure formed by cross-linking or entangling a plurality of cylindrical carbon materials with each other, wherein the diameter of the cross section of each of the cylindrical carbon materials constituting the composite may be 1 to 100 nm, specifically 1 to 50 nm, more specifically 1 to 10 nm.

In that case, the diameter of the titania-carbon ($TiO_{2-x}$—C) composite, which is a collection of a plurality of cylindrical carbon materials, can be 1 to 500 μm, specifically 1 to 100 μm, more specifically 1 to 50 μm, more specifically 1 to 10 μm. The diameter of the composite refers to the largest diameter of the cross-section of the aggregate of the cylindrical carbon materials. The diameter of the composite according to one embodiment of the present invention is 4 to 7 μm. If the diameter of the composite is less than 1 μm, there is a problem that it is difficult to secure a specific surface area for impregnating sulfur because the hierarchical pore distribution is not widely distributed. If the diameter exceeds 500 μm, a lot of voids are formed between the particles and thus the content of sulfur is decreased and the contact area with the current collector is decreased, while the electrode uniformity is reduced. Therefore, in order to provide appropriate voids and uniformity of the electrode, the diameter of the composite is preferably 500 μm or less.

The titania-carbon (TiO$_{2-x}$—C) composite according to the present invention has a high porosity because pores of different sizes are interconnected three-dimensionally. Preferably, the porosity of the composite may be from 10 to 70%, more specifically from 10 to 40%, based on the total volume of the titania-carbon (TiO$_{2-x}$—C) composite. The use of composites having porosity in the above range is desirable for the formation of titania-carbon-sulfur (TiO$_{2-x}$—C—S) composites.

The high level of porosity also means an increase in specific surface area. Specifically, the titania-carbon (TiO$_{2-x}$—C) composite of the present invention has a specific surface area measured by the BET method of 50 to 1000 m$^2$/g, preferably 100 to 500 m$^2$/g, more preferably 200 to 300 m$^2$/g. The range of this specific surface area is very high compared to simple densified composite, which is due to the simultaneous inclusion of macropores and mesopores.

The titania-carbon (TiO$_{2-x}$—C) composite of the present invention includes titania (TiO$_{2-x}$), in which some oxygen in titanium (TiO$_2$ x) is reduced through a thermal reduction process, together with the cylindrical carbon materials. Accordingly, if the sulfur is supported in the titania-carbon (TiO$_{2-x}$—C) composite, the titania-carbon-sulfur (TiO$_{2-x}$—C—S) composites can be produced by introducing the sulfur into at least a part of the external surface and inside of the titania-carbon (TiO$_{2-x}$—C) composite. In that case, sulfur can be supported uniformly. If titania is included, there is an effect of solving the problem of leaching continuously in the electrolyte through the chemical adsorption of TiO$_{2-x}$.

The mixing ratio of the cylindrical carbon material and titania (TiO$_2$ x), in which some oxygen is reduced, may be 1:9 to 5:5 by weight. If the content of titania (TiO$_{2-x}$), in which some oxygen is reduced, is less than the above range, sulfur cannot be uniformly supported. If the content exceeds the above range, the content of the carbon material may be insufficient and thus it may become difficult to exhibit sufficient conductivity.

The titania-carbon (TiO$_{2-x}$—C) composite as described above forms titania-carbon-sulfur (TiO$_{2-x}$—C—S) composite by incorporating sulfur into at least a part of the external surface and inside of the titania-carbon (TiO$_{2-x}$—C) composite.

The sulfur which can be used in the present invention may be various sulfur used in lithium-sulfur battery and includes elemental sulfur (S$_8$), a sulfur-based compound or a mixture thereof. The sulfur-based compound may be selected from the group consisting of a catholyte in which solid Li$_2$S$_n$ (n≥1) is dissolved, an organic sulfur compound and a carbon-sulfur polymer [(C$_2$S$_x$)$_n$: x=2.5 to 50, n 2].

The titania-carbon-sulfur (TiO$_{2-x}$—C—S) composite can support sulfur in a high content due to pores of various sizes and three-dimensionally interconnected and regularly arranged pores within the structure. Therefore, even when soluble polysulfides are produced by electrochemical reaction, if the polysulfides can be located inside the titania-carbon-sulfur (TiO$_{2-x}$—C—S) composite, the phenomenon of collapse of the positive electrode structure can be suppressed due to maintenance of the entangled structure in three dimensions even during leaching of polysulfide. As a result, the lithium-sulfur battery including the sulfur-carbon composite has an advantage that a high capacity can be realized even at high loading. The loading amount of sulfur of the titania-carbon-sulfur (TiO$_{2-x}$—C—S) composite according to the present invention may be 1 mg/cm$^2$ or less, preferably 0.001 to 1 mg/cm$^2$.

The weight ratio of titania-carbon (TiO$_{2-x}$—C) composite and sulfur or sulfur compounds in the titania-carbon-sulfur (TiO$_{2-x}$—C—S) composite is 1:9 to 9:1, preferably 2:8 to 5:5. If the content of sulfur or sulfur compounds is less than the above range, the content of the titania-carbon (TiO$_{2-x}$—C) composites is increased. As the content of carbon is increased, the specific surface area is increased and thus the amount of binder added during slurry preparation must be increased. An increase in the amount of the added binder may eventually result in an increase in the sheet resistance of the electrode and may act as an insulator to prevent electron migration, and thus may degrade the cell performance. If the content of sulfur or sulfur compounds exceeds the above range, sulfur or sulfur compounds not associated with composite are agglomerated between them or are re-leached to the surface of the composite, and thus it may be difficult for the sulfur or sulfur compounds to accept electrons, thereby making it difficult for the sulfur or sulfur compounds to participate directly in the electrode reaction.

Preparation Method of Titania-Carbon-Sulfur (TiO$_{2-x}$—C—S) Composite

As described above, the titania-carbon-sulfur (TiO$_{2-x}$—C—S) composite according to the present invention should form a structure in which cylindrical carbon materials are entangled to each other and three-dimensionally interconnected by mixing the cylindrical carbon materials and titania (TiO$_{2-x}$) in which some oxygen is reduced. For this purpose, in the present invention, it is prepared through spray-drying and thermal reduction method which is easy and mass-producible process.

The method for preparing the titania-carbon-sulfur (TiO$_{2-x}$—C—S) composite according to the present invention may comprise the steps of a) preparing a dispersion of a mixture of a cylindrical carbon material and TiO$_2$; b) spray-drying the dispersion to prepare a titania-carbon (TiO$_2$—C) composite; c) subjecting the titania-carbon (TiO$_2$—C) composite to a thermal reduction treatment to prepare a titania-carbon (TiO$_{2-x}$—C) composite; and d) impregnating the titania-carbon (TiO$_{2-x}$—C) composite with sulfur to prepare the titania-carbon-sulfur (TiO$_{2-x}$—C—S) composite. Hereinafter, the method will be described for each step.

First, in step a), a dispersion containing a mixture of a cylindrical carbon material and TiO$_2$ is prepared (s10).

The cylindrical carbon material may be a rod type or a cylindrical nano structure as mentioned above, preferably a carbon nanotube (CNT), and specifically may be a single wall carbon nanotube (SWCNT) or a multiwall carbon nanotube (MWCNT).

Any TiO$_2$ that can be used can be used as long as it is commonly used in this field, especially if it can be subjected to thermal reduction treatment.

In step a), the mixing ratio of the cylindrical carbon materials:TiO$_2$ may be 1:9 to 5:5 by weight, and the effect of the limitation of the mixing ratio is as described above.

The dispersion medium used for preparing the dispersion of the above-mentioned cylindrical carbon materials and TiO$_2$ may be at least one selected from water, alcohol, benzene, toluene, pyridine, acetone, tetrahydrofuran (THF) and dimethylformaldehyde (DMF). Preferably, a water-based dispersion can be prepared by applying water.

In that case, the concentration of the dispersion can be controlled by various parameters. However, for ease of application to the spraying device and easy removal of the dispersion medium and for quick drying, the dispersion may contain cylindrical carbon materials at a concentration of 10 to 50 g/l, preferably 10 to 30 g/l.

Then, in step b), the dispersion is spray-dried to produce a titania-carbon (TiO$_2$—C) composite.

The spray-drying method used according to one embodiment of the present invention can be performed by supplying the precursor dispersion into a spraying device to form liquid drops by spraying, and drying the liquid drops. In that case, the spray-drying device may include, but is not limited to, a spraying device (a liquid drop generating device), a reactor, and a collecting section.

In this case, the spray-drying may be carried out by a spraying at room temperature/atmospheric pressure, a pressurized spraying, or an electrostatic spraying, and is not particularly limited in the present invention. For example, the pressurized spraying is a method of forming liquid drops by the pressurized spraying of the dispersion through the pressurized sprayer and then preparing particles through a diffusion dryer. In addition, the electrostatic spraying is a method of forming liquid drops through an electrostatic spraying nozzle using a high voltage generator and then preparing particles through a diffusion dryer.

When prepared by the spray-drying method according to the present invention, it can be prepared by a single process, and it is easy to control specific surface area and average pore size of titania-carbon (TiO$_2$—C) composite depending on the processing conditions.

According to one embodiment of the present invention, the liquid drops having an average diameter of 0.5 to 100 μm can be formed by the spraying, and the dispersion medium contained in the liquid drops can be removed by the drying. The diameter of the liquid drops may be preferably in the range of 0.5 to 100 μm, more preferably in the range of 5 to 30 μm. If the diameters of the liquid drops are less than 0.5 μm, the size of the titania-carbon (TiO$_{2-x}$—C) composite produced may become too small. If the diameter of the liquid drops exceeds 100 μm, there is a problem that the size of the titania-carbon (TiO$_2$—C) composite produced may become too large.

The flow rate during spray-drying may be performed at a flow rate of 0.5 to 5 ml/min.

The drying process is not particularly limited as long as the material constituting the liquid drops is at a temperature above the temperature at which it is converted to particles (i.e., agglomerates). The drying process is preferably carried out by heat treatment at a temperature ranging from 50 to 180° C., more preferably from 60 to 150° C., at which the dispersion medium can be sufficiently removed. In that case, the drying temperature may vary depending on the dispersion medium to be used.

The dried template particle-carbon composite is obtained in the form of particles (powder), which is recovered through a recovering device to remove the template particles.

Next, in step c), a titania-carbon (TiO$_{2-x}$—C) composite is prepared by thermal reduction treatment of the titania-carbon (TiO$_2$—C) composite.

The thermal reduction process may be performed in a reducing atmosphere containing no oxygen, that is, an atmosphere containing an inert gas such as helium, neon and argon, hydrogen, nitrogen, or SF$_6$ gas, and may preferably be performed by a hydrogen thermal reduction treatment, specifically in H$_2$/N$_2$ condition in which H$_2$:N$_2$ is mixed in a molar ratio of 0.5:9.5 to 2:8.

The condition for the thermal reduction treatment can be selected within a range capable of thermal reduction treatment of the titania to be used and are not particularly limited, but is appropriately selected within a range of conditions sufficient for thermal reduction of the titania as desired. For example, the thermal reduction treatment may be performed by raising the temperature at 350 to 700° C. for 1 to 4 hours and then maintaining the temperature for 1 to 4 hours, but is not limited thereto.

The titania-carbon (TiO$_{2-x}$—C) composite prepared above can be subjected, if necessary, to a dry ball mill method, a dry jet mill method or a dry dyno-mill method to uniformize the size of the particles before uniforming the size of the particles.

The diameter of the titania-carbon (TiO$_{2-x}$—C) composite proposed in the present invention can be up to 500 μm, and thus the milling may be performed at least once so as to maintain the above range. As a specific method, a method commonly used in this field can be used.

Next, in step d), the titania-carbon-sulfur (TiO$_{2-x}$—C—S) composite is prepared by impregnating the titania-carbon (TiO$_{2-x}$—C) composite with sulfur.

The impregnation of sulfur is not particularly limited in the present invention and can be carried out by a known method.

The step of impregnating the sulfur or sulfur compounds can be carried out by homogeneously mixing titania-carbon (TiO$_{2-x}$—C) composite with the sulfur or sulfur compound powder, heating the mixture and impregnating the titania-carbon (TiO$_{2-x}$—C) composite with the molten sulfur or sulfur compounds.

In that case, the sulfur or sulfur compounds can be impregnated by flowing into the surrounding titania-carbon (TiO$_{2-x}$—C) composite by capillary phenomenon.

The heating temperature may be 115 to 180° C., more specifically 150 to 160° C. According to one embodiment, an energy dispersive spectroscopy (EDS) analysis confirms that sulfur is uniformly coated around the titania-carbon (TiO$_{2-x}$—C) composite rather than the pores between titania-carbon (TiO$_{2-x}$—C) composites.

The heating time may be controlled depending on the content of sulfur or sulfur compounds and titania-carbon (TiO$_{2-x}$—C) composite, and may be, for example, 10 seconds or more, or 30 seconds or more, and 2 hours or less, 1 hour or less, 30 minutes or less, or 10 minutes or less.

If the melting temperature is lower than 115° C., the sulfur or sulfur compound particles may not be melted and thus the sulfur or sulfur compounds may not be properly impregnated into the titania-carbon (TiO$_{2-x}$—C) composite.

The step of impregnating the sulfur or sulfur compounds can be carried out by dissolving the sulfur or sulfur compounds in an organic solvent and then growing sulfur or sulfur compounds by adding the titania-carbon (TiO$_{2-x}$—C) composite.

The organic solvent may be one selected from the group consisting of ethanol, toluene, benzene, N-methyl-2-pyrrolidone (NMP), dimethylsulfoxide (DMSO), acetone, chloroform, dimethylformamide, cyclohexane, tetrahydrofuran and methylenechloride, or a mixed solvent of two or more thereof.

The step of impregnating the sulfur or sulfur compounds may be performed by mixing the titania-carbon (TiO$_{2-x}$—C) composites with the sulfur or sulfur compound powder and then impregnating by a ball mill method.

The mixing method may be carried out by putting it in a powder mixer for a predetermined time. In that case, the mixing time may be 10 minutes or more, or 30 minutes or more, and 10 hours or less, 5 hours or less, or 2 hours or less.

Positive Electrode for Lithium-Sulfur Battery

The titania-carbon-sulfur (TiO$_{2-x}$—C—S) composites proposed in the present invention can be used as a positive electrode active material for a lithium secondary battery and preferably as a positive electrode active material for a lithium-sulfur battery.

A lithium-sulfur battery contains sulfur as a positive electrode active material, but such a lithium-sulfur battery has a problem of leaching of lithium polysulfides during charging and discharging. Accordingly, the titania-carbon-sulfur ($TiO_{2-x}$—C—S) composite according to the present invention is capable of supporting sulfur in a high content due to uniform distribution of sulfur in the structure, pores of various sizes and three-dimensionally interconnected and regularly arranged pores. Therefore, even when lithium polysulfides are leached, because the structure entangled in three dimensions is maintained, it is possible to suppress the phenomenon that the positive electrode structure is collapsed. As a result, the lithium-sulfur battery including the sulfur-carbon nanotube composite has an advantage that a high capacity can be realized even at high loading.

The positive electrode is formed by applying and drying a composition for forming a positive electrode active material layer on a positive electrode current collector. The composition for forming the positive electrode active material layer may be prepared by mixing the above titania-carbon-sulfur ($TiO_{2-x}$—C—S) composite, a conductive material, a binder and a solvent.

Specifically, in order to impart additional electrical conductivity to the titania-carbon-sulfur ($TiO_{2-x}$—C—S) composite, a conductive material may be added to the positive electrode composition. The conductive material serves to move electrons smoothly in the positive electrode, and is not particularly limited as long as it does not cause chemical changes in the battery and provides an excellent electrical conductivity and a large surface area, but preferably a carbon-based material is used.

The carbon-based material may be one selected from the group consisting of graphite such as natural graphite, artificial graphite, expanded graphite and graphene; active carbon; carbon blacks such as channel black, furnace black, thermal black, contact black, lamp black, and acetylene black; carbon fiber; carbon nano structures such as carbon nanotube (CNT) and fullerene; and a combination thereof.

In addition to the carbon-based materials, metallic fiber such as metal mesh; metallic powder such as copper (Cu), silver (Ag), nickel (Ni), and aluminum (Al); or organic electrically conductive materials such as polyphenylene derivatives may also be used according to purpose. The electrically conductive materials may be used alone or in combination.

Also, in order to provide the positive electrode active material with the adhesion to the current collector, the positive electrode composition may further comprise a binder. The binder should be well dissolved in a solvent, and the binder not only has to constitute an electrically conductive network between the positive electrode active material and the conductive material, but also should have an impregnation property of an electrolyte solution.

The binder applicable to the present invention may be any binder known in the art and specifically may be at least one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulosic binders including carboxy methyl cellulose (CMC), starch, hydroxypropyl cellulose, and regenerated cellulose; polyalcohol-based binder; polyolefin based binders including polyethylene and polypropylene; polyimide based binders, polyester based binders, and silane based binders, or a mixture or copolymer of two or more of these, but is not limited thereto.

The content of the binder resin may be, but is not limited to, 0.5 to 30 wt. % based on the total weight of the positive electrode for the lithium-sulfur battery. If the content of the binder resin is less than 0.5 wt. %, the physical properties of the positive electrode may be degraded and thus the positive electrode active material and conductive material may be eliminated. If the content exceeds 30 wt. %, the ratio of the active material and the conductive material in the positive electrode is relatively reduced and thus the capacity of the battery can be reduced.

The solvent for making the positive electrode composition for the lithium-sulfur battery in slurry state should be easy to dry, and should dissolve the binder well, but a solvent capable of keeping the positive electrode active material and the conductive material in a dispersed state without dissolving them is most preferable. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems with the electrically conductive network, thereby causing problems with regard to the operation of the battery.

The solvent according to the present invention may be water or an organic solvent. The organic solvent may be an organic solvent including at least one selected from the group consisting of dimethylformamide, isopropyl alcohol, acetonitrile, methanol, ethanol and tetrahydrofuran.

The mixing of the positive electrode composition can be carried out by a conventional method using a conventional mixer such as a latex mixer, a high-speed shear mixer, or a homo-mixer.

By applying the positive electrode composition to the current collector and vacuum-drying it, a positive electrode for the lithium-sulfur battery can be formed. The slurry can be coated on the current collector in an appropriate thickness depending on the viscosity of the slurry and the thickness of the positive electrode to be formed, and can be suitably selected within the range of 10 to 300 μm.

In that case, there is no limitation on the method of coating with the slurry, and examples thereof may include doctor blade coating, dip coating, gravure coating, slit die coating, spin coating, comma coating, bar coating, reverse roll coating, screen coating, and cap coating methods.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam or nonwoven fabric.

Lithium-Secondary Battery

In one embodiment of the present invention, the lithium secondary battery may include the above-described positive electrode; a negative electrode comprising lithium metal or a lithium alloy as a negative electrode active material; a separator interposed between the positive electrode and the negative electrode; and an electrolyte which is impregnated in the negative electrode, the positive electrode, and the separator and includes a lithium salt and an organic solvent.

The negative electrode may include a material capable of reversibly intercalating or deintercalating lithium ion (Li), a material capable of reversibly forming lithium containing compounds by reacting with lithium ion, or lithium metal or lithium alloy, as the negative electrode active material. The material capable of reversibly intercalating or deintercalating lithium ion can be, for example, crystalline carbon, amorphous carbon, or a mixture thereof. The material capable of reacting with lithium ion to reversibly form lithium containing compounds may be, for example, tin oxide, titanium nitrate or silicon. The lithium alloy may be, for example, an alloy of lithium (Li) and a metal selected from the group consisting of Na, K, Rb, Cs, Fr, Be, Mg, Ca, Sr, Ba, Ra, Al and Sn.

The negative electrode of the present invention may further include, in addition to the negative electrode active material, a pretreatment layer composed of a lithium ion conductive material and a lithium metal protective layer formed on the pretreatment layer.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market include Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be included to reduce the fluidity of the organic solvent. Representative examples of such gelling agent may include polyethylene oxide, polyvinylidene fluoride, and polyacrylonitrile, etc.

The electrolyte impregnated into the negative electrode, the positive electrode, and the separator is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may include at least one selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, and mixtures thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Li$^+$) may be reduced.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may be increased and thus the mobility of the lithium ion (Li$^+$) may be reduced.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charge-discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further included for the purpose of improving storage characteristics at a high temperature, and FEC (fluoro-ethylene carbonate), PRS (propene sultone), FPC (fluoro-propylene carbonate) and the like can be further included.

The electrolyte may be used as a liquid electrolyte or also as an electrolyte separator form in a solid state. When used as a liquid electrolyte, a separator made of porous glass, plastic, ceramic, or polymer is further included as a physical separator having a function of physically separating the electrode.

Hereinafter, the present invention will be described in detail with reference to examples. However, the examples according to the present invention can be modified into various other forms, and the scope of the present invention should not be construed as being limited to the examples described in detail below. Examples of the present invention are provided to more fully describe the present invention to those skilled in the art.

EXAMPLES

Preparation of Carbon Nanotube Composite

Example 1

A water-based dispersion was prepared by mixing the water-based dispersion of multi-wall carbon nanotubes (MWCNT, diameter: 10 to 20 nm) with $TiO_2$ dispersion at a weight ratio of 3:7 of MWCNT and $TiO_2$.

Titania-carbon nanotube ($TiO_2$—CNT) composites were prepared by spray-drying (using SD-Basic by Labplant, flow rate: 2 ml/min, Temperature: 110° C.) the dispersion thus prepared.

The prepared titania-carbon nanotube ($TiO_2$—CNT) composites were recovered and then the dense titania-carbon nanotube particles were subjected to hydrogen thermal reduction treatment, in which the temperature is raised at 500° C. for 2 hours under $H_2/N_2$ conditions (1:9) and maintained for 2 hours, to obtain titania-carbon nanotubes ($TiO_{2-x}$-CNT) composites. The balls of the prepared titania-carbon nanotube ($TiO_{2-x}$-CNT) composites were photographed by SEM (FESEM, Carl Zeiss, SUPRA 55VP) and the result is shown in FIG. 2.

Example 2

3 g of sulfur (S) powder was mixed with 1 g of the titania-carbon nanotube ($TiO_{2-x}$-CNT) composites prepared in Example 1 and melt-diffused at 155° C. for 12 hours to obtain titania-carbon nanotube-sulfur ($TiO_{2-x}$-CNT-S) composites. The balls of the prepared titania-carbon nanotube-sulfur ($TiO_{2-x}$-CNT-S) composites were photographed by TEM (JEM-3010, JEOL), and the result is shown in FIG. 3, and it was found that spherical particles were produced at a size of 2 to 5 μm. Also, an energy dispersive x-ray spectroscopy analysis was performed on the balls of the titania-carbon nanotube-sulfur ($TiO_{2-x}$-CNT-S) composites through EDX photography (DX, BRUKER, XFlash Detector 4010), and the result is shown in FIG. 4. As shown in FIG. 4, it was confirmed that the spherical particles having uniform distribution of $TiO_2$ and sulfur were prepared.

Comparative Example 1

A water-based dispersion containing 2 wt. % of multi-wall carbon nanotubes (MWCNT, diameter: 10 to 20 nm) was spray-dried (Labplant, SD-Basic, flow rate: 2 ml/min, Temperature: 140° C.), and then was dried at 135° C. to prepare carbon nanotube (CNT) particles. After recovering the particles, the dense MWCNT particles were subjected to a heat treatment in which the temperature is raised at 500° C. for 2 hours in an argon (Ar) atmosphere and maintained for 2 hours.

Comparative Example 2

CNT-S composites were prepared by mixing CNT particles of Comparative Example 1 and sulfur (S) powder at a weight ratio of 4:6 and melt-diffused at 155° C. for 12 hours.

Comparative Example 3

A water-based dispersion was prepared by mixing water-based dispersion of multi-wall carbon nanotubes (MWCNT, diameter: 10 to 20 nm) and $TiO_2$ dispersion at a weight ratio of 3:7 of MWCNT and $TiO_2$.

Titania-carbon nanotube ($TiO_2$—CNT) composites were prepared by spray-drying (using SD-Basic by Labplant, flow rate: 2 ml/min, Temperature: 110° C.) the dispersion thus prepared.

Comparative Example 4

Titania-carbon nanotube-sulfur ($TiO_2$—CNT-S) composites were prepared by mixing titania-carbon nanotube ($TiO_2$—CNT) composite particles of Comparative Example 3 and sulfur (S) powder at a weight ratio of 4:6 and melt-diffused at 155° C. for 12 hours.

Experimental Example 1: Evaluation of Physical Properties of Composite (Experiment for the Adsorption of Lithium Polysulfide on Carbon Nanotube Composite)

The balls of titania-carbon nanotube ($TiO_{2-x}$-CNT) composites prepared in Example 1 and the balls of CNT prepared in Comparative Example 1 were precipitated in a solution of Lithium polysulfide and allowed to stand for one day. As shown in FIG. 5, it was visually confirmed that polysulfides exhibit strong chemical adsorption with $TiO_{2-x}$.

In addition, an absorbance analysis (UV-2550, Shimadzu) by UV-Vis spectroscopy was performed and the result is shown in FIG. 6. As shown in FIG. 6, it was confirmed that $S_8$, $S_6^{2-}$ peaks identified at 280 nm and $S_{42}$ peak identified at 420 nm tend to decrease in CNT-$TiO_{2-x}$ balls.

Through these, it was confirmed that the problem of $Li_2S_x$ (4≤x≤6) leached constantly into the electrolyte during charging and discharging of the lithium-sulfur battery is solved by chemical adsorption of $TiO_{2-x}$.

(BET Analysis)

BET (Brunauer-Emmett-Teller) analysis (ASAP 2020, Micrometrics Inc.) for the balls of the titania-carbon nanotube ($TiO_{2-x}$-CNT) composites prepared in Example 1, the titania-carbon nanotube-sulfur ($TiO_{2-x}$-CNT-S) composites prepared in Example 2 and CNT balls prepared in Comparative Example 1 were performed, and the results were in FIG. 7. As shown in FIG. 7, it was confirmed that for Example 1, specific surface area is increased by 108% and pore volume is increased by 31% when $TiO_{2-x}$ nano particles were included. In the case of Comparative Example 1, it was found that due to the nature of CNT balls, macro pores having a size of 50 nm or more account for the majority. Also, in the case of Example 2, it was confirmed that pore volume is reduced by 62.5% after loading of sulfur.

Experimental Example 2: Evaluation for Battery Performance (Manufacture of Lithium-Sulfur Battery)

The composites, denka black (DB-100) and PVDF were mixed in a weight ratio of 80:10:10 of the composites: denka black (DB-100): PVDF and then dispersed in N-methyl-2-pyrrolidone (NMP), and as the composites, Example 2, Comparative Example 2 and Comparative Example 4 were used to prepare positive electrode active material slurries. The prepared positive electrode active material slurries were coated on one surface of an aluminum current collector (20 µm) using a doctor blade method respectively and dried in a convection oven at 65° C. for 24 hours or more to produce positive electrodes. The dried electrode was cut into a circular disk of 12 pi and used as a positive electrode for a lithium-sulfur battery.

CR2032 coin cell half batteries were fabricated using the positive electrodes prepared above. Lithium metal in the form of a disk with a diameter of 15 mm was used as the negative electrode and polypropylene (PP) with a diameter of 18 mm was used as the separator, and an electrolyte including 1,3-dioxolane (DOL):dimethylether (DME)=1:1 (v/v %), 1M LiTFSi and 0.5M LiNO$_3$ was used.

(Charging-Discharging Analysis)

Charging and discharging of the lithium-sulfur battery using the composites of Example 2 (CNT-TiO$_{2-x}$—S ball) were performed in two plateau (2.3V, 2.05V) ranges, and the capacity characteristics and the voltage were measured accordingly. The results are shown in FIG. 8.

In the discharging curve of FIG. 8, it was found that two plateaus (2.3 V, 2.05 V) was reversibly maintained even when the cycles are proceeded. Specifically, 2.3V was found to be due to the reduction of S$_8$ ring and formation of S$_6^{2-}$, and 2.05V was found to be due to the reduction from high polysulfide (Li$_2$S$_n$, 4≤n≤8) to low polysulfide (Li$_2$S$_n$ n≤3)

(Analysis of Cycle Performance)

Capacity characteristics and coulomb efficiency of the lithium-sulfur batteries using the composites of Example 2 (CNT-TiO$_{2-x}$—S ball), Comparative Example 2 (CNT-S ball) and Comparative Example 4 (CNT-TiO$_2$—S ball) were measured at the range of charging/discharging voltage of 1.5 to 2.8 V, and a discharge rate of 0.2 C and a charge rate of 0.2 C. The results are shown in FIG. 9.

It was confirmed that,
in the case of the battery using the composites of Example 2 (CNT-TiO$_{2-x}$—S ball), the initial capacity was 1276 mAh/g, and after 400 cycles, it was maintained at 893 mAh/g (70% maintained, 0.2 C),
in the case of the battery using the composites of Comparative Example 2 (CNT-S ball), the initial capacity was 1131 mAh/g, and after 230 cycles, it was maintained at 324 mAh/g (28% maintained, 0.2 C), and
in the case of the battery using the composites of Comparative Example 4 (CNT-TiO$_2$—S ball), the initial capacity was 1116 mAh/g, and after 400 cycles, it was maintained at 433 mAh/g (39% maintained, 0.2 C).

Through these, it can be seen that when TiO$_{2-x}$ is introduced, a capacity increase of 106% can be expected after 400 cycles compared to CNT-TiO$_2$—S ball (Analysis of Rate Capability)

The change of the capacity characteristics of the lithium-sulfur batteries using the composites of Example 2 (CNT-TiO$_{2-x}$—S ball) and Comparative Example 4 (CNT-TiO$_2$—S ball) according to the charging and discharging was measured in the same manner as the foregoing conditions, and the results are shown in FIG. 9.

It was confirmed that,
in the case of the battery using the composites of Example 2 (CNT-TiO$_2$—X—S ball), when the condition of current density was increased from 0.1 C to 2 C, the capacity was maintained at 653 mAh/g (55% maintained), and
in the case of the battery using the composites of Comparative Example 4 (CNT-TiO$_2$—S ball), the capacity was maintained at 497 mAh/g (41% maintained).

Through these, it can be seen that the electrical conductivity is improved by the use of reduced titania (TiO$_{2-x}$).

The invention claimed is:

1. A titania-carbon-sulfur composite comprising:
   a titania-carbon composite of TiO$_{2-x}$—C, which is prepared from cylindrical carbon materials and titania of formula TiO$_{2-x}$, wherein x is greater than 0 and less than 2, to obtain a structure in which the cylindrical carbon materials are entangled and interconnected in three dimensions; and
   sulfur, which is introduced into at least a part of an external surface and an inside of the titania-carbon composite,
   wherein a ratio of the cylindrical carbon material and the titania of TiO$_{2-x}$ is 3:7 to 5:5 by weight.

2. A method for preparing a titania-carbon-sulfur composite comprising the steps of
   a) preparing a dispersion of a mixture of a cylindrical carbon material and TiO$_2$;
   b) spray-drying the dispersion to prepare a titania-carbon composite of TiO$_2$—C;
   c) subjecting the titania-carbon composite of b) to a thermal reduction treatment to prepare a titania-carbon composite of TiO$_{2-x}$—C, wherein x is greater than 0 and less than 2; and
   d) impregnating the titania-carbon composite of TiO$_{2-x}$—C with sulfur to prepare the titania-carbon-sulfur composite,
   wherein in step a), a mixing ratio of the cylindrical carbon material:TiO$_2$ is 3:7 to 5:5 by weight.

3. The method for preparing the titania-carbon-sulfur composite according to claim 2, wherein in step b), the spray-drying is performed at a flow rate of 0.5 ml/min to 5 ml/min and a temperature of 50° C. to 180° C.

4. The method for preparing the titania-carbon-sulfur composite according to claim 2, wherein in step c), the thermal reduction treatment is carried out by raising a temperature at 350° C. to 700° C. for 1 hour to 4 hours and then maintaining for 1 hour to 4 hours.

5. The method for preparing the titania-carbon-sulfur composite according to claim 4, wherein in step c), the thermal reduction treatment is carried out in an atmosphere comprising one or more selected from the group consisting of helium, neon, argon, hydrogen, nitrogen, and SF$_6$ gas.

6. The method for preparing the titania-carbon-sulfur composite according to claim 2, wherein the dispersion further comprises a dispersion medium comprising at least one selected from the group consisting of water, alcohol, benzene, toluene, pyridine, acetone, tetrahydrofuran (THF) and dimethylformaldehyde (DMF).

7. The method for preparing the titania-carbon-sulfur composite according to claim 2, wherein in step d), the sulfur comprises at least one selected from the group consisting of elemental sulfur and sulfur compounds.

8. A titania-carbon-sulfur composite comprising:
   a titania-carbon composite of TiO$_{2-x}$—C, wherein x is greater than 0 and less than 2, the carbon comprises a cylindrical carbon material, and the titania-carbon composite comprises a structure in which the cylindrical carbon material is entangled and interconnected in three dimensions; and sulfur, which is present in at least a part of an external surface and an inside of the titania-carbon composite, wherein a ratio of the cylindrical carbon material and the titania of $TiO_{2-x}$ is 3:7 to 5:5 by weight.

9. The titania-carbon-sulfur composite according to claim 8, wherein a ratio of the cylindrical carbon material and the titania of $TiO_{2-x}$ is 3:7 by weight.

10. The titania-carbon-sulfur composite according to claim 8, wherein a ratio of the cylindrical carbon material and the titania of $TiO_{2-x}$ is 5:5 by weight.

11. The titania-carbon-sulfur composite according to claim 8, wherein the titania-carbon composite has a porosity of 10% to 40% and a total BET specific surface area of 50 $m^2/g$ to 1000 $m^2/g$.

12. The titania-carbon-sulfur composite according to claim 8, wherein the titania-carbon-sulfur composite has a particle size of 2 μm to 5 μm.

13. The titania-carbon-sulfur composite according to claim 8, wherein the cylindrical carbon material comprises at least one selected from the group consisting of carbon nanotube (CNT), graphite nanofiber (GNF), carbon nanofiber (CNF), and activated carbon fiber (ACF).

14. The titania-carbon-sulfur composite according to claim 8, wherein the titania-carbon composite used to prepare the titania-carbon-sulfur composite has an average particle size of 1 μm to 500 μm.

15. The titania-carbon-sulfur composite according to claim 8, wherein the titania-carbon composite has a porosity of 10% to 70% and a total BET specific surface area of 50 $m^2/g$ to 1000 $m^2/g$.

16. The titania-carbon-sulfur composite according to claim 8, wherein the sulfur comprises at least one selected from the group consisting of elemental sulfur and sulfur-based compounds.

17. A positive electrode comprising the titania-carbon-sulfur composite according to claim 8.

18. The positive electrode according to claim 17, wherein the positive electrode is for a lithium-sulfur battery.

19. A lithium secondary battery comprising the positive electrode of claim 17; a negative electrode; and an electrolyte.

* * * * *